(12) United States Patent
Kim et al.

(10) Patent No.: US 7,836,244 B2
(45) Date of Patent: Nov. 16, 2010

(54) METHOD OF PROVIDING BLOCK STATE INFORMATION IN SEMICONDUCTOR MEMORY DEVICE INCLUDING FLASH MEMORY

(75) Inventors: Hye-Young Kim, Seoul (KR); Jung-Been Im, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 73 days.

(21) Appl. No.: 11/933,564

(22) Filed: Nov. 1, 2007

(65) Prior Publication Data

US 2008/0109591 A1 May 8, 2008

(30) Foreign Application Priority Data

Nov. 2, 2006 (KR) ...................... 10-2006-0107556

(51) Int. Cl.
*G06F 12/00* (2006.01)
*G06F 13/00* (2006.01)
*G06F 13/28* (2006.01)

(52) U.S. Cl. ............................... 711/103; 711/E12.008
(58) Field of Classification Search .................. 711/103
See application file for complete search history.

(56) References Cited

U.S. PATENT DOCUMENTS

| 5,349,558 | A |   | 9/1994 | Cleveland et al. |
| 6,003,135 | A | * | 12/1999 | Bialick et al. ................. 726/29 |
| 6,161,195 | A |   | 12/2000 | Konishi et al. |
| 6,288,940 | B1 |   | 9/2001 | Kawamura |
| 6,956,769 | B2 |   | 10/2005 | Lee |
| 7,009,889 | B2 |   | 3/2006 | Tran et al. |
| 7,464,306 | B1 | * | 12/2008 | Furuhjelm et al. ........... 714/710 |
| 2003/0095439 | A1 | * | 5/2003 | San et al. ................ 365/185.22 |
| 2004/0080998 | A1 |   | 4/2004 | Chang et al. |
| 2006/0023524 | A1 | * | 2/2006 | Konishi ....................... 365/200 |
| 2006/0034136 | A1 |   | 2/2006 | Abedifard |
| 2007/0276978 | A1 | * | 11/2007 | Wang et al. .................. 710/305 |
| 2007/0285981 | A1 | * | 12/2007 | Roohparvar ........... 365/185.09 |
| 2008/0211638 | A1 | * | 9/2008 | Masui et al. .............. 340/10.51 |
| 2009/0077434 | A1 | * | 3/2009 | Furuhjelm et al. ........... 714/710 |

FOREIGN PATENT DOCUMENTS

| JP | 05151098 | 6/1993 |
| JP | 05204561 | 8/1993 |
| JP | 08-138389 | 5/1996 |
| JP | 09163293 | 6/1997 |
| JP | 09198884 | 7/1997 |
| JP | 11-250675 | 9/1999 |
| JP | 2002-269992 | 9/2002 |
| JP | 2004227723 | 8/2004 |
| KR | 1020060083336 A | 7/2006 |

* cited by examiner

*Primary Examiner*—Sheng-Jen Tsai
(74) *Attorney, Agent, or Firm*—Volentine & Whitt, PLLC (57) ABSTRACT

A method of providing block state information in a semiconductor memory device including a flash memory comprises storing block state information on at least one bad block of the flash memory and a plurality of reserved blocks which replace the at least one bad block, and providing the stored block state information to a user in response to a command provided by the user.

8 Claims, 7 Drawing Sheets

| Byte | F/V | Descriptions |
|---|---|---|
| 0-361 | X | Vendor specific |
| 362 | V | Off-line data collection status |
| 363 | X | Self-test execution status byte |
| 364-365 | V | Total time in seconds to complete off-line data collection activity |
| 366 | X | Vendor specific |
| 367 | F | Off-line data collection capability |
| 368-369 | F | SMART capability |
| 370 | F | Error logging capability<br>7-1    Reserved<br>0      1=Device error logging supported |
| 371 | X | Vendor specific |
| 372 | F | Short self-test routine recommended polling time (in minutes) |
| 373 | F | Extended self-test routine recommended polling time (in minutes) |
| 374-385 | R | Reserved |
| 386-510 | X | Vendor specific |
| 511 | V | Data structure checksum |

Key:
F=the content of the byte is fixed and does not change.
V=the content of the byte is variable and may change depending on the state of the device or the commands executed by the device.
X=the content of the byte is vendor specific and may be fixed or variable.
R=the content of the byte is reserved and shall be zero.

| Value | Command |
|---|---|
| 00h-CFh | Reserved |
| D0h | SMART READ DATA |
| D1h | Obsolete |
| D2h | SMART ENABLE/DISABLE ATTRIBUTE AUTOSAVE |
| D3h | SMART SAVE ATTRIBUTE VALUES |
| D4h | SMART EXECUTE OFF-LINE IMMEDIATE |
| D5h | SMART READ LOG |
| D6h | SMART WRITE LOG |
| D7h | Obsolete |
| D8h | SMART ENABLE OPERATIONS |
| D9h | SMART DISABLE OPERATIONS |
| DAh | SMART RETURN STATUS |
| DBh | Obsolete |
| DCh-DFh | Reserved |
| E0h-FFh | vendor specific |

FIG. 5

| Byte | F/V | Descriptions |
|---|---|---|
| 0-361 | X | Vendor specific |
| 362 | V | Off-line data collection status |
| 363 | X | Self-test execution status byte |
| 364-365 | V | Total time in seconds to complete off-line data collection activity |
| 366 | X | Vendor specific |
| 367 | F | Off-line data collection capability |
| 368-369 | F | SMART capability |
| 370 | F | Error logging capability<br>7-1     Reserved<br>0        1=Device error logging supported |
| 371 | X | Vendor specific |
| 372 | F | Short self-test routine recommended polling time (in minutes) |
| 373 | F | Extended self-test routine recommended polling time (in minutes) |
| 374-385 | R | Reserved |
| 386-510 | X | Vendor specific |
| 511 | V | Data structure checksum |

Key:
F=the content of the byte is fixed and does not change.
V=the content of the byte is variable and may change depending on the state of the device or the commands executed by the device.
X=the content of the byte is vendor specific and may be fixed or variable.
R=the content of the byte is reserved and shall be zero.

FIG. 6

| Byte | F/V | Descriptions |
|---|---|---|
| 0 ~ 1 | X | SMART DATA VERSION OF SSD |
| 2 ~ 3 | X | THE AMOUNT OF USEFUL INFORMATION |
| 4 ~ 7 | V | THE NUMBER OF RESERVED BLOCKS |
| 8 ~ 11 | V | THE NUMBER OF ADDITIONAL BAD BLOCKS |
| 12 ~ 15 | X | THE NUMBER OF INITIAL BAD BLOCKS |

FIG. 7

| Register | 7 | 6 | 5 | 4 | 3 | 2 | 1 | 0 |
|---|---|---|---|---|---|---|---|---|
| Features | E0h ||||||||
| Sector Count | REFERENCE VALUE ||||||||
| Sector Number | na ||||||||
| Cylinder Low | 4Fh ||||||||
| Cylinder High | C2h ||||||||
| Device/Head | obs | na | obs | DEV | na | na | na | na |
| Command | B0h ||||||||

FIG. 8

| Register | 7 | 6 | 5 | 4 | 3 | 2 | 1 | 0 |
|---|---|---|---|---|---|---|---|---|
| Features | DAh ||||||||
| Sector Count | na ||||||||
| Sector Number | na ||||||||
| Cylinder Low | 4Fh ||||||||
| Cylinder High | C2h ||||||||
| Device/Head | obs | na | obs | DEV | na | na | na | na |
| Command | 80h ||||||||

METHOD OF PROVIDING BLOCK STATE INFORMATION IN SEMICONDUCTOR MEMORY DEVICE INCLUDING FLASH MEMORY

BACKGROUND AND SUMMARY

1. Background of the Invention

The present disclosure relates to semiconductor memory devices and, more particularly, to a method of providing block state information in a semiconductor memory device having a flash memory.

A claim of priority is made under 35 U.S.C. §119 from Korean Patent Application 10-2006-0107556, filed on Nov. 2, 2006, the contents of which are hereby incorporated by reference in their entirety.

2. Description of the Related Art

Memory devices can be generally classified into two broad categories. These categories are volatile memory devices and non-volatile memory devices. Volatile memory devices do not retain their stored data in the event of a power loss. However, non-volatile memory devices retain their data even in the event of a power loss.

A commonly used non-volatile memory device is a flash memory device. In a flash memory device, data is stored in memory cells. Furthermore, transistors generally function as memory cells in flash memory devices. A flash memory device may be programmed with data or data stored in a flash memory may be deleted using different programming and data deletion techniques. For example, a flash memory device may be programmed by use of a tunneling effect. In the tunneling effect, a relatively large positive potential difference is created between a control gate and a substrate of the transistor. This potential difference causes the electrons on the surface of the substrate to be pushed and trapped to the floating gate. These electrons act as a barrier between the control gate and the channel on the substrate, thus increasing the threshold voltage of the cell transistor. Alternatively, a hot carrier effect may be used to program and/or delete data to/from a memory cell.

In either case, as the number of programming and delete operations increase, the reliability of the memory cells (and thus of the memory device) reduces. That is, there is a limit to the number of programming and delete operations that may be performed on flash memory devices without compromising on the reliability of the device. After such a limit is reached, there may be a substantial increase in programming errors on the device.

To counter the effects of having defective memory blocks, flash memory devices use techniques to replace bad memory blocks with reserved memory blocks that are known to be reliable, i.e., good memory blocks. Many of these techniques involve checking the address of a memory block during a read or write operation. If there is an error in the read or write operation, the block is determined to be a bad block and is then replaced by a reserved block which is assigned the same physical address as that of the bad block. A write or read operation of data is then performed through the reserved block.

Figure 1:
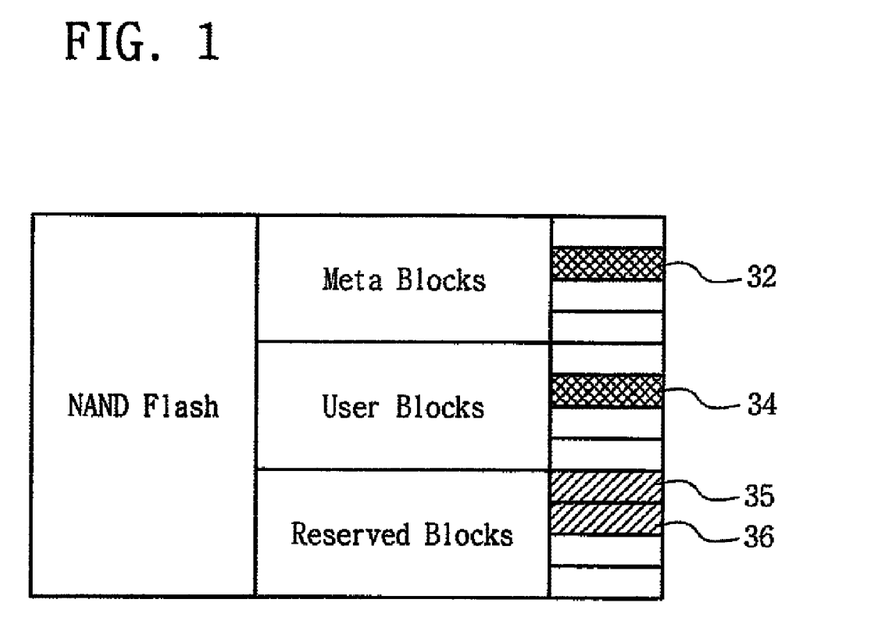
FIGS. 1 and 2 illustrate a configuration of a general flash memory.
Figure 2:
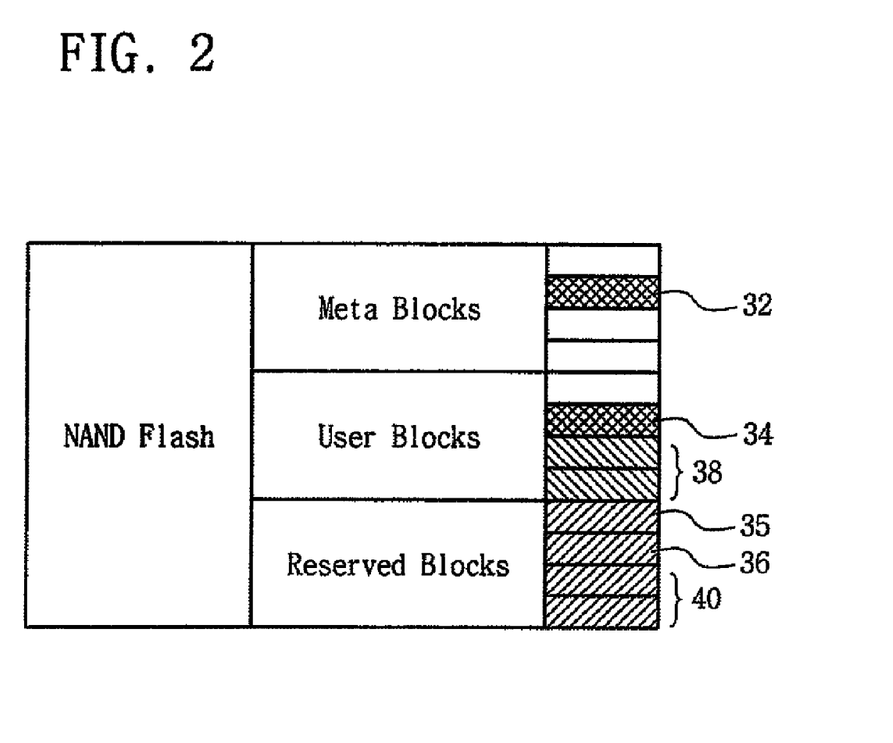

FIGS. 1 and 2 illustrate a configuration of general flash memory. As shown in FIGS. 1 and 2, a flash memory includes meta blocks, user blocks and reserved blocks.

The meta block is a block that is generally used to store information associated with bad blocks, information associated with reserved blocks, and mapping information. The user block is generally used to store data. The reserved block, as described above, is used to replace a bad block.

Referring to FIG. 1, if blocks 32 and 34 go bad, these are each replaced with reserved blocks 35 and 36. In this case data is not written to or read from blocks 32 and 34. Instead, data is written to or read from blocks 35 and 36. Now, if another block such as block 38 were to go bad, then block 38 would be replaced with a reserved block 40.

However, when all the bad blocks (including the initial bad blocks), are replaced during the operation, that is, when all the reserved blocks are exhausted, the stability of semiconductor memory device can be no longer guaranteed. At this time, in order to maintain the integrity of the data already stored in the device, the semiconductor memory device automatically goes into a write prohibition state or read-only state. At this time, a user realizes that the life of the memory device is over and therefore executes a memory retention procedure such as, for example, a data backup.

While the integrity of stored data can be maintained as described above, there is no procedure to forewarn the user of the memory device that all the reserved memory blocks are about to be used up. If the user were forewarned, he may be able to take other preventive measures rather than just backing up the data. There is therefore a need for systems and methods which provide memory block state information upon receipt of a request from a user.

SUMMARY

One aspect of the present disclosure includes a method of providing block state information in a semiconductor memory device including a flash memory. The method comprises storing block state information on at least one bad block of the flash memory and a plurality of reserved blocks which replace the at least one bad block, and providing the stored block state information to a user in response to a command provided by the user.

BRIEF DESCRIPTION OF THE DRAWINGS

The present disclosure will become more fully understood from the detailed description given hereinbelow and the accompanying drawings which are given by way of illustration only, and thus are not limitative of the present disclosure, and wherein.

DETAILED DESCRIPTION

Exemplary embodiments of the present disclosure will now be described more fully hereinafter with reference to FIGS. 3 to 8, in which embodiments of the invention are shown. This disclosure may, however, be embodied in many different forms and should not be construed as limited to the embodiments set forth herein. Rather these embodiments are provided so that this disclosure will be thorough and complete, and will fully convey the scope of the invention to those skilled in the art.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Figure 3:
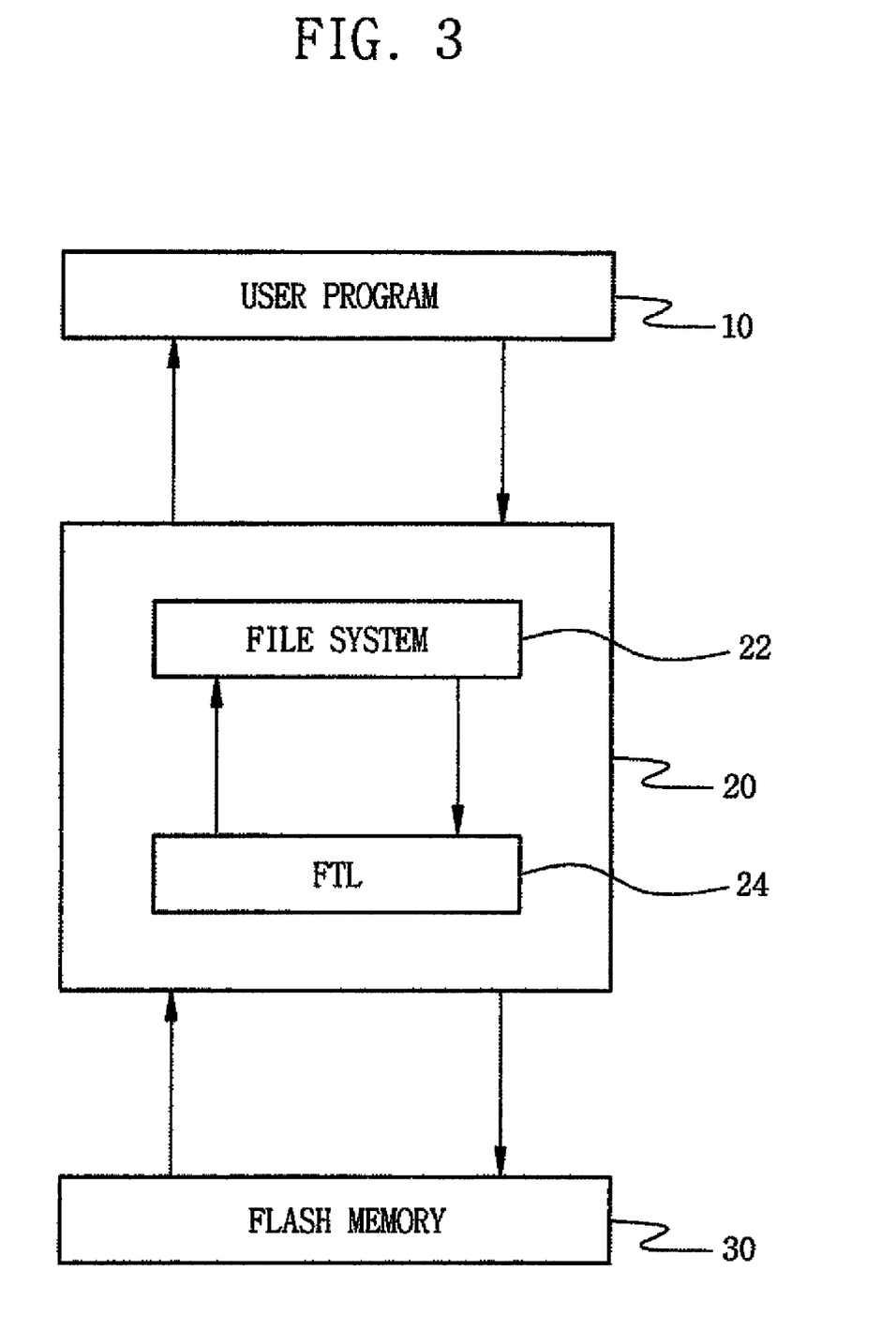
FIG. 3 is a block diagram of a semiconductor memory device including a flash memory according to an exemplary disclosed embodiment.

FIG. 3 is a block diagram of a semiconductor memory device including a flash memory according to an exemplary disclosed embodiment. Referring to FIG. 3, the semiconductor memory device includes a flash memory 30 and a controller 20 to load a user program 10.

Data is read from or written to the flash memory 30 via the controller 20. Specifically, the controller 20 performs a control function such that a given data operation is implemented in the flash memory 30. Typically, the data operation is performed based on the contents of the user program 10 that is loaded into the controller 20.

The controller 20 includes a file system 22 which loads the user program 10, and a flash translation layer (hereinafter, referred to as 'FTL') 24. In an exemplary embodiment, the FTL 24 performs an operation of mapping a logical address generated in the file system with a physical address of the flash memory 30.

Similar to RAMs, nonvolatile memories, and magnetic memories, the flash memory can be randomly accessed. However, the flash memory is deleted in blocks, unlike RAMs, nonvolatile memories, and magnetic memories. Further, in the case of the flash memory, before writing, deletion is performed in blocks. Furthermore, in general, a data unit in which the deletion operation is performed may be more than a data unit in which the writing operation is performed.

This deletion of large quantities of data may be a problem not only because it may be difficult to use the flash memory as a main memory but also because it may be difficult to keep the file system intact as a general hard disk when using the flash memory as an auxiliary memory device. Thus, in order to hide the deletion operation of the flash memory, the FTL 24 between the file system 22 and the flash memory 30 is used.

Through the address mapping function of the FTL 24, a host can recognize the flash memory 30 as a hard disk driver, and can access the flash memory device by the same method as the host would access a hard disk driver. The FTL 24 may be realized as a hardware type independent from host system, or may be realized as a device driver type within the host system.

In using the semiconductor memory device described above as an SSD (Solid State Disk) or hard disk, to provide block state information for bad blocks of flash memory and reserved blocks remaining after a replacement for the bad blocks to a user, an exemplary embodiment of the disclosure employs S.M.A.R.T related commands of an ATA (Advanced Technology Attachment) interface.

The SMART is an abbreviation of 'Self-Monitoring, Analysis and Reporting Technology'. Problems like breakdown causable in the near future relating to a disk driver may be predicted through the SMART function.

Values observed through the SMART function used by different vendors differ based on the vendor. For example, there may be a difference between vendors as to what kinds of formats will be used for reporting values such as, for example, head flying height, data throughput performance, spin-up time, re-allocated sector count, seek time error, seek time performance, spin time performance, spin try recount, and drive calibration retry count.

Figure 4:
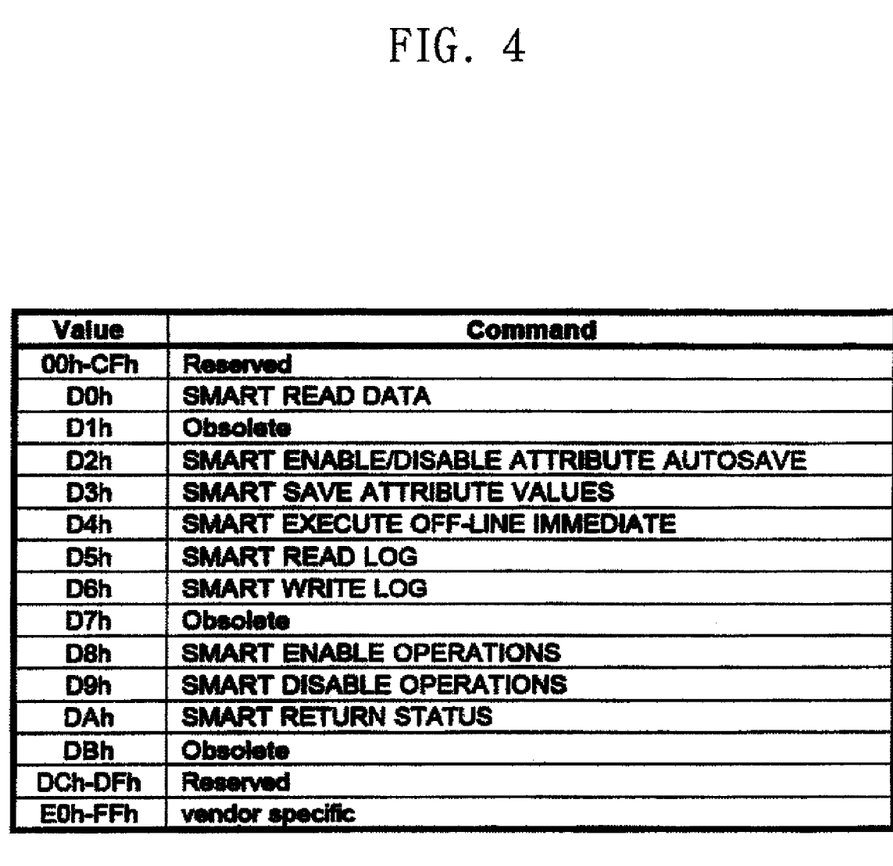
FIG. 4 illustrates a command format of SMART commands according to an exemplary disclosed embodiment.

FIG. 4 illustrates a command format in which SMART commands are classified according to a value of 'feature register'. The SMART commands shown in FIG. 4 are well known to those skilled in the art, thus its detailed description will be omitted.

In these SMART commands, nine commands, 'SMART READ DATA(D0h)', 'SMART ENABLE/DISABLE ATTRIBUTE AUTOSAVE(D2h)', 'SMART SAVE ATTRIBUTE VALUES(D3h)', 'SMART EXECUTE OFF-LINE IMMEDIATE(D4h)', 'SMART READ LOG(D5h)', 'SMART WRITE LOG(D6h)', 'SMART ENABLE OPERATIONS(D8h)', 'SMART DISABLE OPERATIONS(D9h)' and 'SMART RETURN STATUS', are standardized.

To provide the block state information a 'SMART READ DATA' command having a 'feature register' value of 'D0h' may be used. Furthermore, as a command to provide the block state information, a command, e.g., 'FFh', corresponding to one 'feature register' value within a range of E0h~FFh as an area of 'feature register' value usable by a vendor, may be used. Additionally, any one of the nine standard commands may be used.

'F' indicates that a content of corresponding byte is fixed and unchangeable, and 'V' indicates that a content of corresponding byte is variable and changeable. 'R' indicates a content of corresponding byte is reserved and it should become '0'. 'X' designates that a content of corresponding byte is usable by a vendor and may be fixed or variable.

Figure 5:
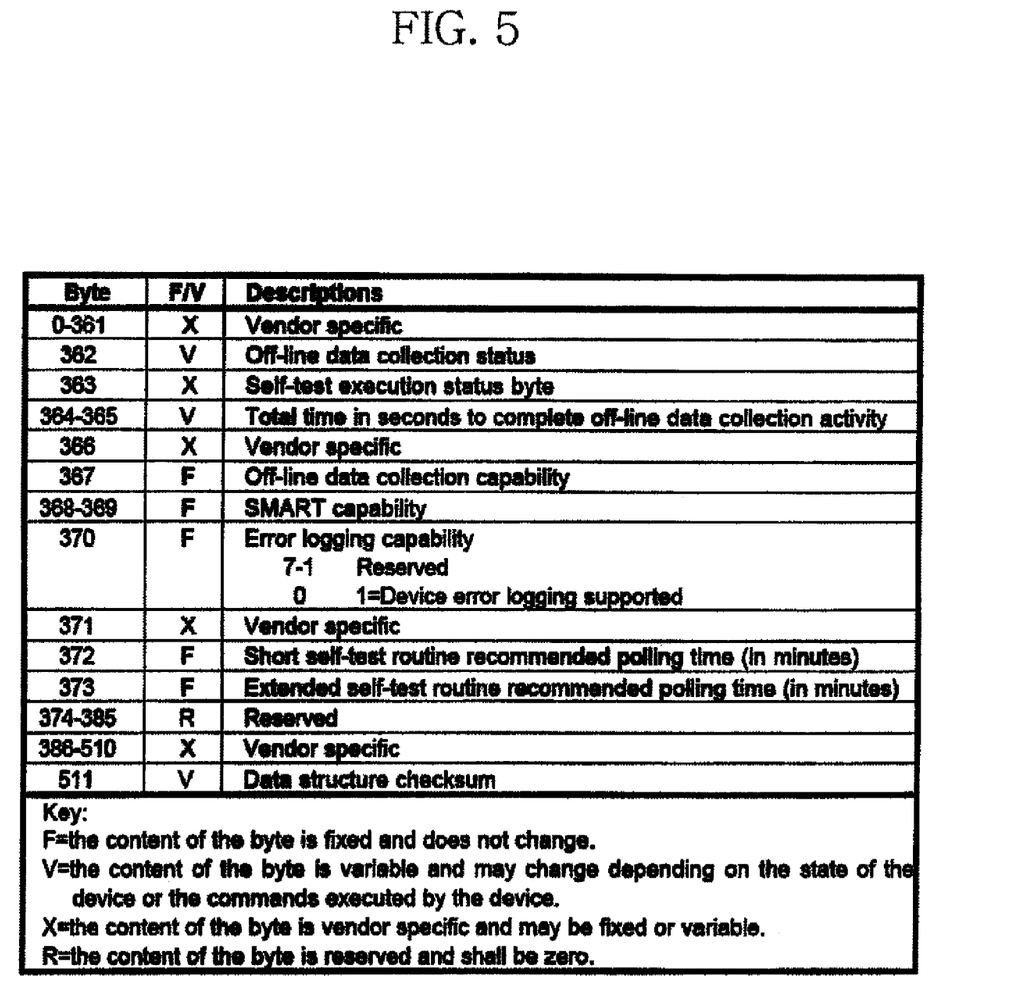
FIG. 5 illustrates a data structure for a result value of a 'SMART READ DATA' command according to an exemplary disclosed embodiment.

A structure of data for a result value of the 'SMART READ DATA' command is shown in FIG. 5. As shown in FIG. 5, the data structure of the 'SMART READ DATA' command may be constructed of 512 bytes. Specifically, information on reserved blocks, initial bad blocks, additional bad blocks generated during the use of the flash memory, etc. may be stored in vendor-specific data areas ($0^{th}$ to $361^{st}$ bytes and $386^{th}$ to $510^{th}$ bytes) of the 'SMART READ DATA' command. This is shown in FIG. 6.

Figure 6:
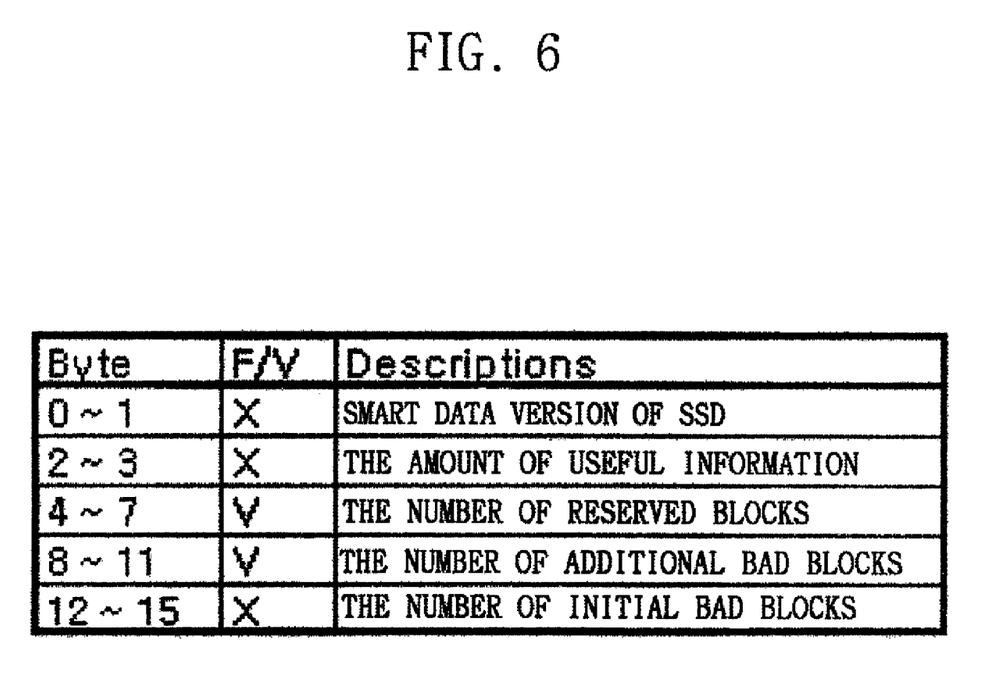
FIG. 6 illustrates a data region that provides block state information according to an exemplary disclosed embodiment.

For example, as shown in FIG. 6, information on a version of SMART data may be stored in the $0^{th}$ to $1^{st}$ bytes, information on the amount of useful information may be stored in the $2^{nd}$ to $3^{rd}$ bytes, information on the number of reserved blocks may be stored in the $4^{th}$ to $7^{th}$ bytes, information on the number of additional bad blocks may be stored in the $8^{th}$ to $11^{th}$ bytes, and information on the number of initial bad blocks may be stored in the $12^{th}$ to the $15^{th}$ bytes. In addition, in the remaining part of the vendor-specific data areas, other necessary information necessary may be stored.

Block state information for the reserved blocks or bad blocks may be already stored in the 'FTL' performing a mapping for blocks or in the meta blocks of the flash memory. Furthermore, a user may obtain information about the number of reserved blocks or bad blocks from the 'SMART READ DATA' command.

Additionally, to provide a point of time for execution of an operation such as a user-performed data backup, a warning may be provided to a user when the number of available reserved blocks reaches a reference value. The user may set the reference value, thereby being capable of controlling a warning time point. In an exemplary embodiment, in providing the warning or controlling the warning time point, a specific command in the SMART commands may be used.

As shown in FIG. 4, for example, when the number of available reserved blocks reaches the reference value, a 'SMART RETURN STATUS' command having 'feature register' value of 'DAh' may be used in the SMART commands, to provide a warning to a user.

In addition, in order to provide warnings to a user, another command having another 'feature register' value, for example, 'FFh', within a range of E0h~FFh usable by a vendor may be used. One skilled in the art will appreciate that the commands referred to above are discussed for exemplary purposes only. Commands from other areas may be used without departing from the scope of the disclosure. Furthermore, it may be possible to use any one of the nine standard commands.

The user may also set the reference value to provide a warning at the appropriate time, as described above. In this case, the reference value may be set in a vendor-specific area of a command having one of the 'Feature register' values of E0h~FFh (for example, a command having the 'Feature register' value of 'FFh'). For example, a warning time point may be determined by a command having the 'Feature register' value of 'E0h'. This is shown in FIG. 7.

Figure 7:
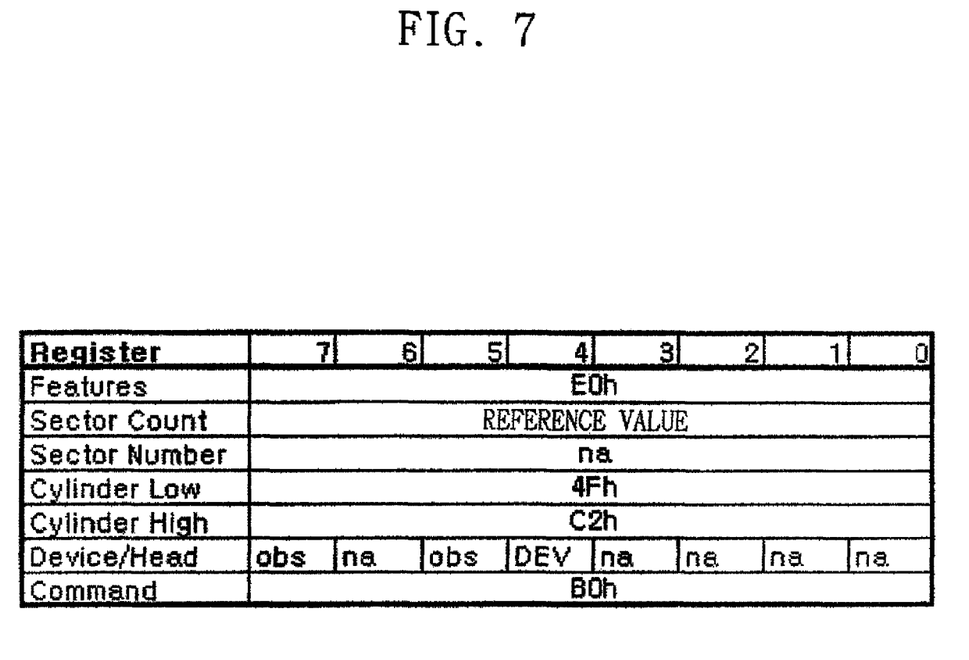
FIG. 7 illustrates a format of a command to control a warning time point according to an exemplary disclosed embodiment.

FIG. 7 illustrates a format of a command to control a warning time point according to an exemplary disclosed embodiment. As shown in FIG. 7, an ATA command may be defined as a command code and its accompanying variables. These variables are transferred through different registers. These registers may include, for example, 'Feature register', 'Sector Count register', 'Sector Number register', 'Cylinder Low register', 'Cylinder High register', 'Device/Head register' etc. Furthermore, 'DEV' of the 'Device/Head register' may indicate whether the semiconductor memory device is used as a master HDD or a slave HDD.

A command to control the warning time point is a sub command of the SMART command whose command code is 'B0h'. Furthermore, the code of the sub command is 'E0h'. A user may set the reference value in the 'Sector Count register'. When the number of available reserved blocks reaches the reference value, a warning is issued.

Figure 8:
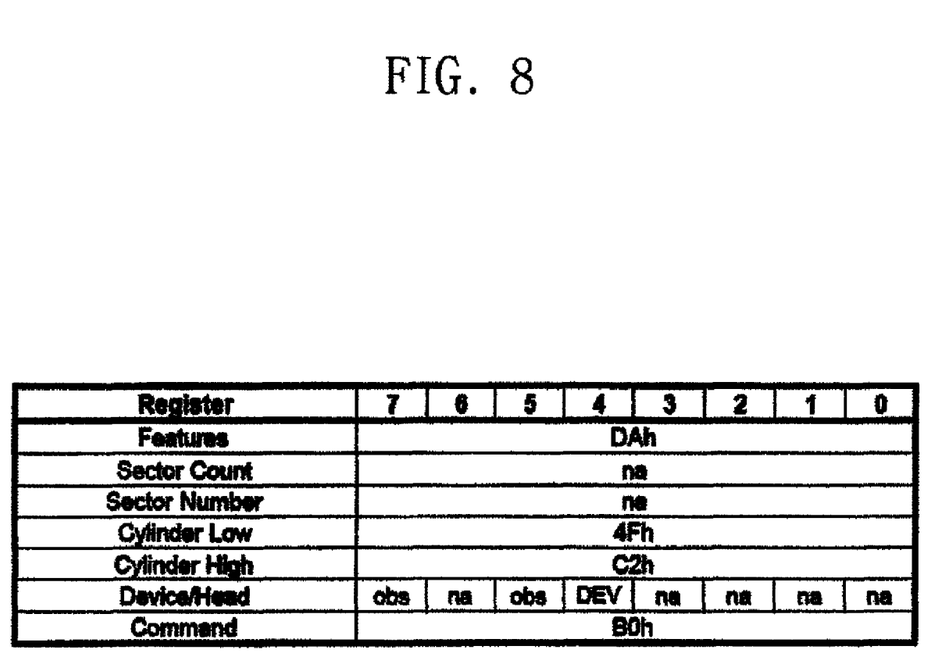
FIG. 8 illustrates an output for a command to provide a warning to a user according to an exemplary disclosed embodiment.

FIG. 8 illustrates an output provided when a command, e.g., 'DAh', to provide a warning to a user, is used. When the semiconductor memory device does not reach the warning time point, the 'Cylinder Low register' preserves a setting of '4Fh', and the 'Cylinder High register' keeps a setting of 'C2h' as shown in FIG. 8. However, as shown in FIG. 9, when the semiconductor memory device reaches the warning time point, the 'Cylinder Low register' is set as 'F4h', and the 'Cylinder High register' is set as '2Ch'. At this time, a user may execute an operation to back up the stored data so as to maintain the integrity of the stored data.

The disclosed system provides a warning to a user when the number of available reserved blocks reaches the reference value. This warning permits the user to execute an operation such as, for example, a data backup, in order to maintain the integrity of the stored data. In addition, the disclosed system permits the user to set the time point at which the warning is provided. That is, the user can set the reference value to be compared to the number of available reserved blocks, thereby being capable of controlling a warning time point.

It will be apparent to those skilled in the art that modifications and variations can be made in the present disclosure without deviating from the spirit or scope of the disclosure. Thus, it is intended that the present disclosure cover any such modifications and variations of this invention provided they come within the scope of the appended claims and their equivalents. Accordingly, these and other changes and modifications are seen to be within the true spirit and scope of the invention as defined by the appended claims.

What is claimed is:

1. A method of providing block state information in a semiconductor memory device including a flash memory, the method comprising:

storing, in the flash memory, block state information on at least one bad block of the flash memory and a plurality of reserved blocks which replace the at least one bad block, wherein the block state information includes the number of bad blocks, the number of reserved blocks present in the flash memory, and information denoting a number of available reserved blocks in the flash memory, providing the stored block state information to a user in response to a command provided by the user, and providing a warning to the user when the number of available reserved blocks reaches a reference value, wherein the reference value is variably set by a vendor in a vendor-specific area of a command having one of register values, and wherein a warning time point when the warning is provided is determined by the command having the one of the register values, and wherein the method is executed during at least one of a read operation and write operation of the flash memory.

2. The method of claim 1, further including the block state information in meta blocks, the meta blocks configured to store block information and mapping information of the flash memory.

3. The method of claim 1, wherein the command is a 'SMART READ DATA' command, the 'SMART READ DATA' command being part of ATA (Advanced Technology Attachment) commands.

4. The method of claim 1, wherein the command is a vendor-specific command selected from ATA (Advanced Technology Attachment) commands.

5. The method of claim 1, further including determining the warning time point by using a vendor-specific command selected from ATA (Advanced Technology Attachment) commands.

6. The method of claim 1, wherein the semiconductor memory device is a SSD (Solid State Disk) including a NAND flash memory.

7. A method of providing block state information in a semiconductor memory device including a flash memory, the method comprising:

storing, in the flash memory block state information of a bad block of the flash memory and a reserved block which replaces the bad block;

providing the stored block state information to a user by using a command of 'SMART READ DATA', the 'SMART READ DATA' command being part of ATA (Advanced Technology Attachment) commands; and providing a warning to the user by using a command of 'SMART RETURN STATUS' from the ATA commands, when a capacity or a number of the reserved blocks reaches a predetermined level, wherein the predetermined level to provide a warning time is variably set by a vendor in a vendor-specific area of a command having one of register values, and wherein a warning time point when the warning is provided is determined by the command having the one of the register values, and wherein the method executed during at least one of a read operation and a write operation of the flash memory.

8. The method of claim 7, further including determining the warning time point by using a vendor-specific command selected from the ATA (Advanced Technology Attachment) commands.

* * * * *